2,893,832
PURIFICATION OF TUNGSTATES

Pai Yen Loung, Glen Cove, N.Y., assignor to Wah Chang Corporation, New York, N.Y., a corporation of New York No Drawing. Application November 18, 1957
Serial No. 696,929

4 Claims. (Cl. 23—51)

This invention relates to the purification of tungsten values and specifically to the removal of phosphorus and arsenic impurities from tungsten values. The application is a continuation-in-part of my copending application, Serial No. 466,274, filed November 2, 1954, now abandoned, and similarly entitled.

The principal object of this invention is to provide a simple, effective and economical process for the separation of phosphorus and arsenic impurities from tungsten values. In accordance with this invention the tungsten values, if they are not available as an alkali metal tungstate, are first placed in the form of alkali metal tungstate solution which is then purified to effect the removal of phosphorus and arsenic impurities by heating and hot filtering the solution at an adjusted alkaline pH. The removal of the phosphorus and arsenic impurities is achieved by crystallization of the alkali metal tungstate from such a solution containing a suitable amount of alkaline metal hydroxide, after heating and upon hot filtering the tungstate crystals. In accordance with this invention the alkali metal tungstate solution should have an initial alkali metal hydroxide concentration in the range of about 0.4% to about 4% by weight of the solution. The pH of the solution should be so adjusted to be preferably around 13 and, more generally, in the range of 12 to 14.

An alkali metal tungstate solution having been prepared in accordance with the above principles, is then evaporated to reduce its original volume to a point where precipitation of alkali metal tungstate crystals takes place. The exact amount of volume reduction will, of course, depend upon the original concentration of the alkali metal tungstate in the solution. As a general rule, and from a commercial standpoint, it is economical to form the original alkali metal tungstate solution in a concentration of about 200 grams per liter by weight of alkali metal tungstate. When the concentration is thus adjusted a reduction in the volume by heating the solution and evaporating it of about 400 to 500 grams per liter will often be sufficient to induce the desired precipitation of alkali metal tungstate crystals.

The mixture of hot solution and alkali metal tungstate crystals is then filtered to remove the tungstate crystals and it will be found that the crystals so removed are either substantially free of phosphorus and arsenic impurities or contain those impurities in an amount which is substantially reduced.

As the solution is evaporated and its aqueous component thereby diminished the relative amount of alkali metal hydroxide will increase. If as a result the pH reaches 14 or above there will exert a tendency to precipitate phosphorus impurities, therefore in the preferred practice of the invention when utmost freedom from impurities is desired and the removal of relatively large amounts of water by evaporation is contemplated the pH should be initially adjusted to a lower part of the range.

In the preferred practice of the invention the mother liquor resulting from the first filtration is treated by acidification to adjust its pH within the range of 12 to 14 and evaporation and subsequent filtering is carried out to obtain a second crop of alkali metal tungstate crystals. If desired, this step may again be repeated and repeated. As the successive crops of alkali metal tungstate crystals are obtained the amount of phosphorus and arsenic present therein will increase slightly. There is an end point beyond which it is not practical to repeat the step of adjusting the pH of the mother liquor and again evaporating to induce precipitation and filtering to remove the precipitated crystals of alkali metal tungstate depending upon the reduction of impurities desired and the cost of repeating the step. I have found that a repetition of the second step at least twice is often useful depending upon the overall freedom from phosphorus and arsenic which is desired in the combined precipitate from the successive operations. The following examples are illustrative of the practice of this invention.

Example I 3 liters of sodium tungstate solution, with pH of about 14, obtained from acid digestion of Korean scheelite which had not been previously acid leached to remove phosphorus and which had been treated with NaOH, was first evaporated to about one-half of its original volume, filtered hot, and first crop of sodium tungstate crystals obtained. Acid was then added to keep the pH at 14, and the operation repeated to obtain the second, third and fourth crops of sodium tungstate crystals. The last filtrate was cooled to room temperature with water, and a mixture of crystals containing tungsten and phosphorus obtained. The following table represents the results:

|  | $WO_3$ | P | Distribution | |
|---|---|---|---|---|
|  |  |  | $WO_3$, percent | P, percent |
| Sodium tungstate solution (Head calculated) | 3,000 cc | 350.37 gm./l | 0.49 gm./l | 100 | 100 |
| 1st $Na_2WO_4$ crystals | 336 gms | 76.81% | 0.01% | 24.56 | 2.04 |
| 2d $Na_2WO_4$ crystals | 675 gms | 75.13% | 0.04% | 48.25 | 18.37 |
| 3d $Na_2WO_4$ crystals | 263 gms | 74.80% | 0.04% | 18.72 | 7.48 |
| 4th $Na_2WO_4$ crystals | 95 gms | 59.15% | 0.08% | 5.35 | 5.44 |
| Mixed W-P crystals | 28 gms | 48.15% | 3.07% | 1.28 | 57.83 |
| Mother liquor | 150 cc | 129.44 gm./l | 0.86 gm./l | 1.84 | 8.84 |

The high tungsten content in the mixed tungsten and phosphorus crystals is accounted for by the filtration of the fourth crop of crystals without adding water. Similarly the phosphorus in the mother liquor is a high value because of insufficient cooling before the final filtration step. The total trioxide percentage in the 1369 grams of sodium tungstate crystals product is 74.37% against 0.036% of phosphorus to provide a 66.67% of phosphorus elimination from the original sodium solution.

Example II 3 liters of sodium tungstate solution with pH of about 14 obtained from acid digests of Korean scheelite which had not been previously acid leached to remove phosphorus and which had been treated with NaOH was first evaporated to two-thirds, then one-fifth of the original volume, cooled at 5° C., evaporated to about one-tenth of the original volume, filtered after each step.

The following table presents the results:

|  |  | Assay | | Distribution | |
|---|---|---|---|---|---|
|  |  | $WO_3$ | P | $WO_3$, percent | P, percent |
| Sodium tungstate solution (Head calculated) | 3,000 cc | 365.32 g./l. | 0.57 g./l. | 100 | 100 |
| 1st $Na_2WO_4$ crystals | 600 gms | 77.22% | 0.5% | 42.28 | 17.65 |
| 2d $Na_2WO_4$ crystals | 693 gms | 75.38% | 0.04% | 47.66 | 16.47 |
| 3d $Na_2WO_4$ crystals | 76 gms | 69.32% | 0.05% | 4.81 | 2.35 |
| 4th $Na_2WO_4$ crystals | 27 gms | 52.07% | 3.71% | 1.28 | 58.82 |
| 5th $Na_2WO_4$ crystals | 35 gms | 61.83% | trace | 1.97 |  |
| Mother Liquor | 180 cc | 121.56 g./l. | 0.45 g./l. | 2.00 | 4.71 |

With the fourth group of sodium tungstate crystals produced by this example eliminated, the total sodium tungstate crystal production was 1404 grams with 0.044% of phosphorus to give a 96.72% recovery of trioxide from the original sodium tungstate solution and a 63.53% elimination of phosphorus. As described above in connection with the flow sheet, the mother liquor may be recycled.

The above examples deal with the common alkali metal tungstate solution, i.e., the sodium species, and generally, in commercial operations sodium tungstate solutions will be formed because of their convenience and cost. The invention is operable, however, when the other alkali metal tungstates are used.

It will be noted that among the advantages of the process of this invention is a substantial recovery of tungsten values relatively free from phosphorus without the use of expensive chemical agents. The process of this invention has the further advantage that the operations are conducted under the alkaline conditions which permit the use of relatively inexpensive processing kettles or containers. In addition the by product salts are unobjectionable substances which are readily disposed of.

Having thus described my invention I claim:

1. The method of removing arsenic and phosphorus impurities from alkali metal tungstates containing such impurities in which the alkali metal tungstate is dissolved in water together with an amount of alkali metal hydroxide which hydroxide, in amount, constitutes about 0.4 to about 4 percent by weight of the final solution, adjusting the pH of the solution to a value of 12 to 14 and, thereafter, heating said solution to cause evaporation of its aqueous content to a point where substantial amounts of alkali metal tungstate crystals are precipitated therefrom and filtering the heated solution to remove said crystals.

2. The process of claim 1 in which the alkali metal component of the named compounds is sodium.

3. The process of claim 1 in which the mother liquor separated from said crystals from said filtration is adjusted to a pH of 12 to 14 and the liquor is again heated to evaporate further amounts of the aqueous component thereof and induce the precipitation of further amounts of alkali metal tungstate which are then filtered from the hot solution.

4. The process of claim 3 in which the alkali metal component of the named compounds is sodium.

References Cited in the file of this patent
UNITED STATES PATENTS 2,556,255    Carosella _____ June 12, 1951